US009253251B2

(12) United States Patent
Jackson et al.

(10) Patent No.: US 9,253,251 B2
(45) Date of Patent: Feb. 2, 2016

(54) SYSTEM AND METHOD FOR DETERMINING A VEHICLE PROXIMITY TO A SELECTED ADDRESS

(71) Applicant: ENDEAVORING, LLC, Palatine, IL (US)

(72) Inventors: Scott A. Jackson, Palatine, IL (US); Luke Smith, Palatine, IL (US)

(73) Assignee: ENDEAVORING, LLC, Palatine, IL (US)

( * ) Notice: Subject to any disclaimer, the term of this patent is extended or adjusted under 35 U.S.C. 154(b) by 177 days.

(21) Appl. No.: 14/213,176

(22) Filed: Mar. 14, 2014

(65) Prior Publication Data

US 2014/0201266 A1    Jul. 17, 2014

Related U.S. Application Data

(63) Continuation-in-part of application No. 13/230,507, filed on Sep. 12, 2011, now Pat. No. 8,781,169.

(60) Provisional application No. 61/789,989, filed on Mar. 15, 2013, provisional application No. 61/409,623, filed on Nov. 3, 2010.

(51) Int. Cl.
*G06K 9/00* (2006.01)
*H04L 29/08* (2006.01)
(Continued)

(52) U.S. Cl.
CPC .............. *H04L 67/10* (2013.01); *G08G 1/0175* (2013.01); *G08G 1/205* (2013.01); *G06K 2209/15* (2013.01)

(58) Field of Classification Search
CPC .......... G06K 9/00711; G06K 9/00785; G06K 2209/15; G08G 1/017; G08G 1/0175; G08G 1/205; G06Q 30/0224; G06Q 30/0251; G06Q 30/0255; G06Q 30/0259; G06Q 30/0261; G06Q 30/0265; G06Q 30/0266; G06Q 30/0267; G06Q 30/0269
See application file for complete search history.

(56) References Cited

U.S. PATENT DOCUMENTS 6,081,206 A    6/2000  Kielland ................ 340/937
7,103,614 B1   9/2006  Kucik .................... 707/104.1
(Continued)

OTHER PUBLICATIONS

Web Page from "Digital Recognition Network" dated Apr. 12, 2010.
(Continued)

*Primary Examiner* — Andrew W Johns
(74) *Attorney, Agent, or Firm* — Klintworth & Rozenblat IP LLC

(57) ABSTRACT

A system for determining the proximity of client devices to locations of interest is provided. The system includes a data server configured to receive data identifying a plurality of vehicles and associated vehicle locations and an input processor configured to process the received data to identify a plurality of locations of interest related to one or more assets. A database in operative communication with the data server is provided to store the locations of interest as information records. A notification server is provided to receive data identifying geographic locations of a plurality of client devices. An output processor is operatively coupled to the notification server and is configured to determine whether one or of more the client devices are within a predetermined proximity to one or more of the locations of interest. The output processor is further configured to generate a proximity alert when the one or more client devices are determined to be within the predetermined proximity to one or more of the locations of interest.

20 Claims, 10 Drawing Sheets

(51) Int. Cl.
  *G08G 1/017* (2006.01)
  *G08G 1/00* (2006.01)

(56) References Cited

U.S. PATENT DOCUMENTS

| | | | |
|---|---|---|---|
| 2002/0111881 A1 | 8/2002 | Walker et al. | 705/26 |
| 2009/0005987 A1* | 1/2009 | Vengroff et al. | 701/300 |
| 2013/0006769 A1* | 1/2013 | Schalk et al. | 705/14.54 |
| 2014/0172576 A1* | 6/2014 | Spears et al. | G06Q 30/0266 705/14.63 |
| 2015/0134453 A1* | 5/2015 | Jhunjhnuwala | G06F 17/30241 705/14.58 |
| 2015/0142572 A1* | 5/2015 | Vijayakrishnan | G06Q 30/0261 705/14.58 |

OTHER PUBLICATIONS

Office Action from U.S. Appl. No. 13/230,507, dated Feb. 3, 2014.

* cited by examiner

Fig. 10

| Location 1001 | Recency 1022 | TimeStamp 1024 | ... | GPS 1026 |
|---|---|---|---|---|
| Address 1002 | | | | |
| Hits 1004 | | | | |
| VIN 1006 | | | | |
| License Plate 1008 | | | | |
| Make 1010 | | 1000 | | |
| Model 1012 | | | | |
| ... | | ... | | |
| Target 1014 | | | | |
| ... | | | | |
| Behavior 1 1016 | | | | |
| Behavior 2 1018 | | | | |

SYSTEM AND METHOD FOR DETERMINING A VEHICLE PROXIMITY TO A SELECTED ADDRESS

CROSS-REFERENCE TO RELATED APPLICATIONS

This application claims the benefit of priority from provisional patent application Ser. No. 61/789,989, filed on Mar. 15, 2013, and is a continuation-in-part of prior U.S. patent application Ser. No. 13/230,507, filed on Sep. 12, 2011, which claims the benefit of priority from provisional patent application Ser. No. 61/409,623, filed on Nov. 3, 2010, each of which is hereby incorporated by reference in its entirety.

BACKGROUND OF THE INVENTION

1. Technical Field

The present disclosure relates to systems for identifying locations of interest. In particular, this disclosure relates to systems for issuing alerts and providing information about assets within the locations of interest when users are determined to be nearby the location of interest.

2. Background

Vehicles and other assets may be repossessed when a borrower is delinquent in payment of a loan or other contractual agreement. In a common scenario, if the borrower cannot timely service the loan and is delinquent in payments, the creditor may seek to repossess the vehicle or other asset, either directly or more commonly, through an affiliated repossession company.

The borrower may willingly relinquish possession of the vehicle or asset to the repossession company. In such circumstances, the repossession company may take possession of the vehicle or asset at the debtor's residence. In other situations, the debtor may not willingly relinquish possession of the vehicle or asset and, in the case of vehicles, may hide the vehicle or otherwise maintain the vehicle at an undisclosed location away from his or her place of residence. This renders it difficult for the repossession company to locate the vehicle.

Further, when a vehicle to be repossessed cannot be easily located, agents, "skip-tracers," and "spotters" associated with the repossession company may randomly view the license plates of vehicles in areas known to be frequented by the debtor, often based on the description of the vehicle. However this is very expensive, inefficient and time-consuming because the agent, spotter, or skip-tracer may have a set of documents for each vehicle to be repossessed, and must cross-reference the documents in his possession with each suspect license plate that he or she views while driving or while a passenger in a spotter vehicle. Additionally, using agent, spotter, or skip-tracer is inherently unreliable because it necessarily depends on the agent, spotter, or skip-tracer's ability to locate and accurately identify a vehicle.

SUMMARY

A system for determining the proximity of client devices to locations of interest is provided. The system includes a data server configured to receive data identifying a plurality of vehicles and associated vehicle locations and an input processor configured to process the received data to identify a plurality of locations of interest related to one or more assets. A database in operative communication with the data server is provided to store the locations of interest as information records. A notification server is provided to receive data identifying geographic locations of a plurality of client devices. An output processor is operatively coupled to the notification server and is configured to determine whether one or more the client devices are within a predetermined proximity to one or more of the locations of interest. The output processor is further configured to generate a proximity alert when the one or more client devices are determined to be within the predetermined proximity to one or more of the locations of interest.

In another aspect, a non-transitory computer readable storage medium is provided having stored therein data representing instructions executable by a programmed processor for determining proximity of communication devices to locations of interest. The storage medium includes instructions operative for receiving data identifying a plurality of assets and geographic locations associated with the assets and processing the received data to identify a plurality of locations of interest related to one or more of the assets. The storage medium includes instructions for storing the locations of interest to a database as an information record including data related to the location of interest, and identifying a location of a communication device. The storage medium further includes instructions for determining whether the location of the communication device is within a predetermined proximity to one or more locations of interest, and generating a proximity notification when the communication device is within the predetermined proximity to the one or more locations of interest.

In further aspects, a computer-implemented method using at least one processor for determining proximity of client devices to a location of interest is provided. The method includes receiving data identifying information related to a plurality of assets and a plurality of geographic locations associated with the assets. The received data is processed to identify locations of interest and a proximity area for each of the locations of interest. The location data for a plurality of client devices is monitored and a proximity alert is generated when one or more of the plurality of client devices is determined to be within the proximity area for one or more location of interest

BRIEF DESCRIPTION OF THE DRAWINGS

The system may be better understood with reference to the following drawings and the description. The components in the figures are not necessarily to scale, emphasis instead being placed upon illustrating the principles of the invention. Moreover, in the figures, like-referenced numerals designate corresponding parts throughout the different views.

FIG. 10 is an exemplary illustration of a location index that may be generated according to one embodiment.

DETAILED DESCRIPTION

Figure 1:
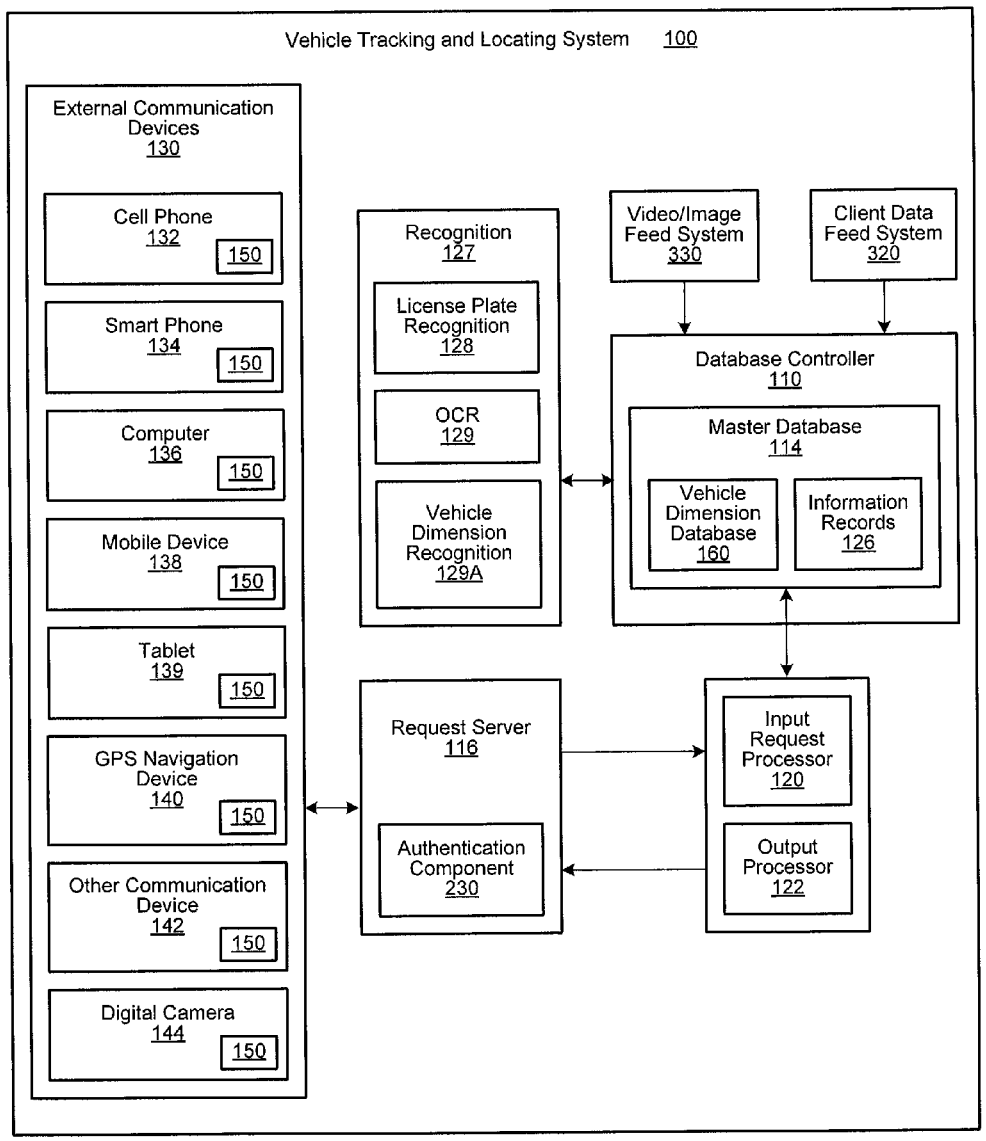
FIG. 1 is a block diagram of an exemplary vehicle tracking and locating system according to one embodiment.

FIG. 1 illustrates a vehicle tracking and locating system 100 that permits a user to obtain information relating to a vehicle of interest. A vehicle of interest may be a stolen vehicle, a vehicle subject to repossession, or any vehicle for which further information is sought by the user. A vehicle of interest may also relate to any vehicle associated with a marketing effort or advertising campaign. A vehicle of interest may be an asset included in a loan portfolio of a creditor.

The vehicle tracking and locating system 100 includes a database controller 110 in operative communication with a master database 114, a request server 116 configured to receive a data request from a user or agent, an input request processor 120 operatively coupled to the request server 116, and an output processor 122 operatively coupled to the request server 116 and configured to provide data of interest from information records 126 stored in the master database 114.

A recognition module 127, may be operatively coupled to the request server 116 and to the database controller 110, and may further include a license plate recognition system (LPRS) 128 or ALPR system (automatic license plate recognition), an optical character recognition system 129, and a dimensional recognition system 129A.

Users may communicate with the request server 116 using a variety of remote or external communication devices 130 to transmit a data request to the request server 116 regarding a particular vehicle of interest. The external communication devices 130 may be wireless devices and/or wired devices, such as cellular telephones 132, smart phones 134, computers 136, mobile devices 138, tablets 139, a GPS navigation device 140, or any suitable communication device 142. The user may transmit a data request by inputting: a vehicle identification number (VIN), a license plate number, a photographic image of a license plate or the vehicle itself, or a video containing images of the vehicle and its associated license plate, as captured by the communication device 130 or by a digital camera 144.

Figure 2:
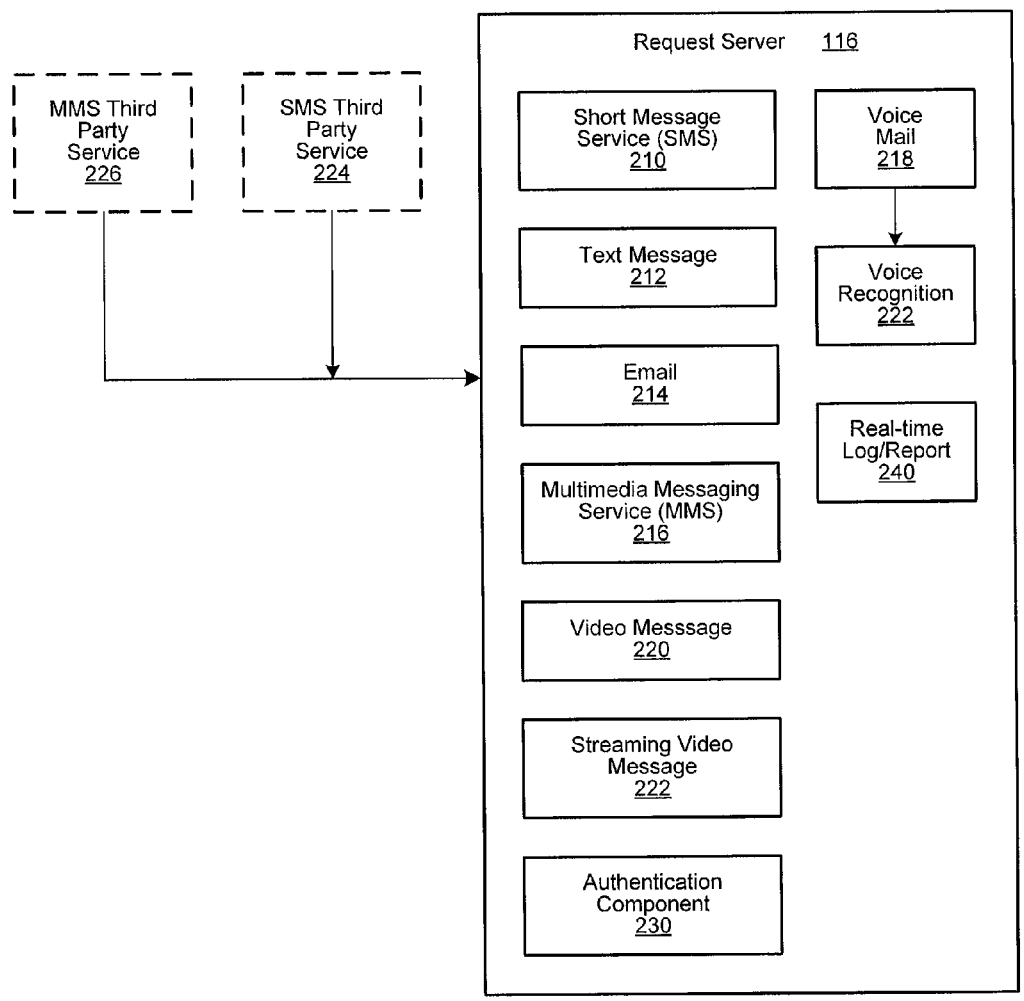
FIG. 2 is a block diagram of an exemplary request server according to one embodiment.

Referring to FIG. 2, when the request server 116 receives the request from the user, the request may be in a variety of different formats using different communication protocols depending upon the type of external communication device 130 that is used and the communication mode in which it is operating. The dataflow may include varied protocols and message formats handled by hardware or software modules or components, such as a short message service (SMS) module 210, a text message module 212, an email message module 214, a multimedia message service (MMS) module 216, a voicemail (VM) module 218, a video module 220, or a streaming video module 222, for example. Any suitable component or module may be used to decode, format, and process the message received. The SMS module 210 may be a SMS server dedicated to receiving and processing SMS communication, while the MMS module 216 may be an MMS server dedicated to receiving and processing MMS communication.

Each of the requests or messages from the user is preferably decoded and handled by the input message component or handler directed toward that particular protocol or message format. Further, a voice recognition system 222 may be coupled to the voicemail module 218 to convert the voice message into a text message so that the text message can be provided to the request server 116. The request server 116 may include an authentication component 230 configured to verify and authenticate that the requesting user is authorized to access the vehicle tracking and locating system 100. A real-time log 240 may also be generated and maintained by the request server 116.

Such input message modules (210, 212, 214, 216, 218) or handlers, whether hardware, software, a combination of hardware or software, may be resident within the request server 116 or within another component of the vehicle tracking and locating system 100, or may be separate and independent from the vehicle tracking and locating system 100.

Alternatively, some input message components or handlers, services, and functions may be provided by a third-party or third-party component. The short message service (SMS) service module 210 may be provided by or replaced by an independent third-party SMS messaging service 224, and may be external to the vehicle tracking and locating system 100. The third-party SMS messaging service 224 may be provided by an entity referred to as "TextMeForBusiness.com." Such third-party SMS providers 224 essentially host the SMS transactions and provide the necessary infrastructure to manage and service the SMS transactions, such as text to screen formatting, auto-response, message formatting, and other features. Such third party providers receive the data request from the external communication devices 130, and decode, extract, format, and forward the user message to the request server 116.

Similarly, a third party MMS (multi-media service) provider 226 may replace the multi-media messaging service module 216 in the request server 116, and may be external to the vehicle tracking and locating system 100. Such third-party MMS providers 226 essentially host the MMS transactions and provide the necessary infrastructure to manage and service the MMS transactions, such as text to screen formatting, auto-response, message formatting, and other features. Such third party providers receive the data request from the external communication devices 130, and decode, extract, format, and forward the user message to the request server 116. As referred to herein, the SMS service module 210 may be used interchangeably with the SMS third party provider service 224 because the end result is essentially similar, that is, the message is received and processed. Similarly, the MMS service module 216 may be used interchangeably with the MMS third party provider service 226.

As an overview regarding the user process for accessing the vehicle tracking and locating system 100, the following example involves use of the SMS format, but is applicable to any embodiment utilizing a different message format. In this example, the user may type a plurality of digits, such as a multi-digit access code, into the external communication device 130, such as a cellular telephone 132, smart phone 134, or any other communication device, which directs the call to the short message services (SMS) module 210 or to the SMS third party provider 224, for example. In response, the SMS module 210 or the SMS third party service provider 224 requests that the user provide a query, assuming that the user is authorized to access the system.

The user or agent may respond by entering "plate=333ABCD." This informs the vehicle tracking and locating system 100 that the user is inquiring about a license plate number. Alternatively, the user may respond by entering the VIN number. Further, the user may respond by attaching a photographic image, a video stream, or any attachment containing the license plate number for which further information is desired, as will be discussed in greater detail below.

The SMS third party service provider 224 decodes and formats the request to the request server 116, which in turn, obtains the requested information from the master database

114 via a database lookup. If the requested license plate number is found in the database, information about the corresponding vehicle is provided to the user via the SMS third party service provider 224 or in another format as provided via output processor 122. Such information includes, for example, data about a possible repossession action or stolen vehicle action, the registered owner of the vehicle, name of debtor or lien-holder, lien status, vehicle insurance status, vehicle year, vehicle make, vehicle model, vehicle color, VIN number, associated finance company, date that vehicle entered a repossession list or a stolen vehicle list, case number, location status (address and/or GPS coordinates), law enforcement status (stolen, owner APB, predator in a restricted area, etc.), and the like. Also, when a match is found, the system may transmit an electronic copy of the documents corresponding to the vehicle of interest.

Figure 3:
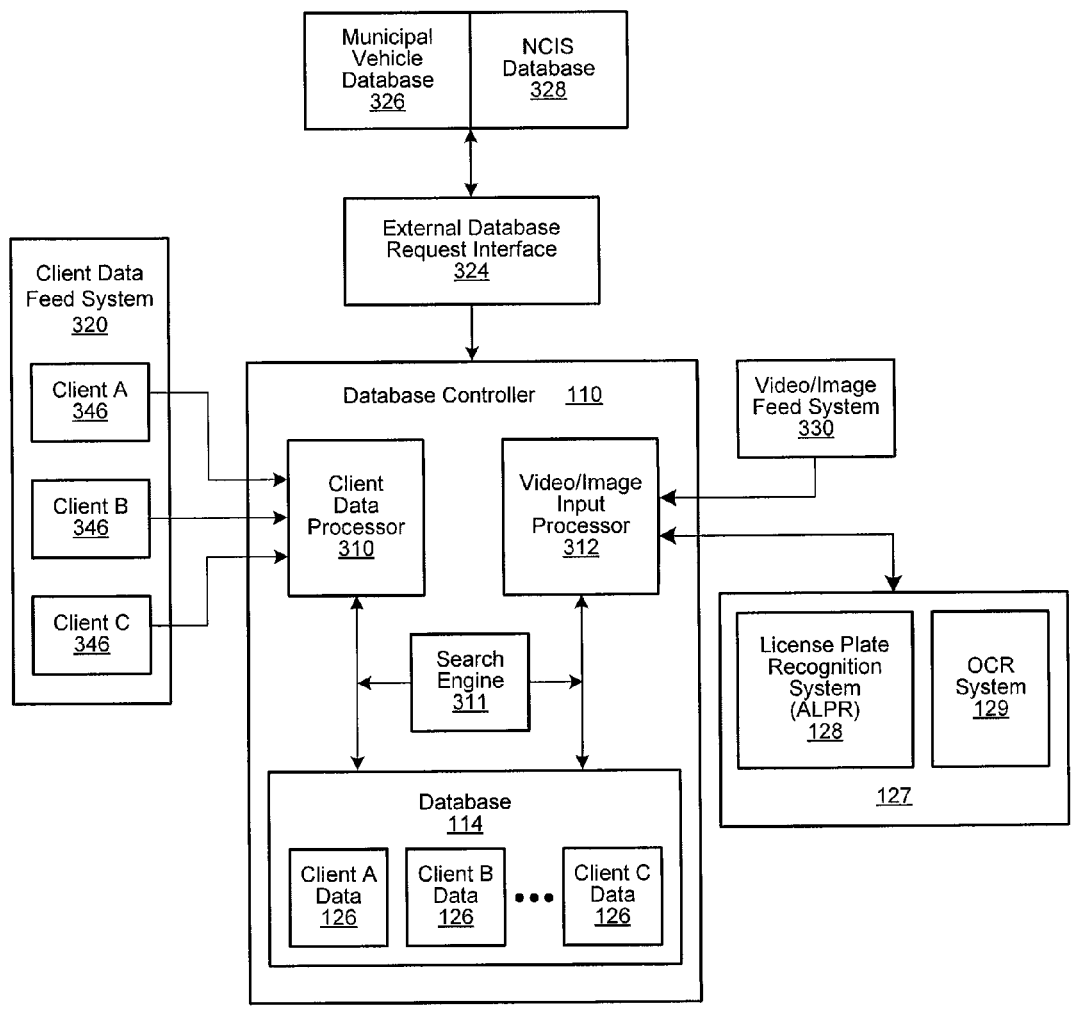
FIG. 3 is a block diagram of an exemplary database controller according to one embodiment.

Referring to FIG. 3, one embodiment of the database controller 110 is illustrated. The database controller 110 includes a client data processor 310, a search engine 311, and a video and image input processor 312 operatively coupled to the master database 114. The client data processor 310 may receive input from a client data feed system 320, while the video and image input processor 312 may receive input from a video/image feed system 330, the license plate recognition system 128, and an optical character recognition system 129.

The master database 114 may be updated based on input from the client data feed system 320, which includes multiple "clients" 346. Such clients 346 may represent the various credit companies, banking entities, finance credit companies, vehicle credit agencies, and law enforcement agencies, which may have agreements in place with owner of the vehicle tracking and locating system 100. Such clients 346 or third-party entities provide data to the master database 114 through the database controller 110 based on vehicles that are subject to repossession for nonpayment of loans with respect to banking and credit agencies, while law enforcement may provide additional data with respect to stolen vehicles. Alternatively, the database controller 110 may access remote databases through an external database request interface or communication link 324. The database controller may request information from external databases, such as municipal vehicle databases 326 and the National Crime Information Center (NCIC) database 328, which maintains a record of all vehicles reported stolen in the United States, and other municipal, state, and Federal databases.

The client data feed system 320 facilitates data transfer from the clients 346, including documents and messages. The data may be in the form of CSV files (comma separated value), PDF documents, or may be any suitable data format. The database controller 110 may create, update, and/or delete information records in the master database 114 based on the information received from the clients 346. The documents and data may be transmitted using standard file transfer protocol, such as FTP, for example.

In one specific embodiment, the master database 114 may be segmented or divided into separate logical data areas corresponding to the specific client source. For example, a first client may be TRW Credit Corp., while a second client may be GE Credit Corp. The master database 114 may be segmented for security and privacy considerations because if a vehicle is subject to repossession with respect to a first client, only repossession agencies authorized by that first client are permitted to access the corresponding information and engage in action related to the repossession of the subject vehicle.

In some embodiments, a user may be denied information about a vehicle subject to repossession if that user is not authorized by the client 346. Thus, in one embodiment, such a user may not even be informed by the vehicle tracking and locating system 100 that a requested vehicle license plates corresponds to a vehicle subject repossession if that user is not authorized by the client to receive such information. Accordingly, even if a particular vehicle is subject to a repossession order, if the user inquiring about that that license plate number is not a member of one of the repossession companies authorized to handle repossession of that car, that user may not receive an affirmative indication that the vehicle is subject to repossession. Alternatively, the user may be given an indication that the vehicle is subject to repossession but that the requesting user is not authorized to go forward with the associated repossession.

In other embodiments, rather than logically or physically segmenting the master database 114, the information records 126 may instead be tagged or associated with the corresponding client 346. The search engine 311 may inspect the associated client identifier and provide requested information only if there is a match between the information record associated with the client 346 and the authorization status of the user requesting the information.

The database controller 110 may provide access to the master database 114 on a multi-tier basis. For example, authentication and access may be provided based on three access levels, such as a master administrator level, a manager level, and a user level, each with different privileges and access rights.

Master administrator rights are typically granted to selected employees of the company that own and control the master database 114. The master administrator determines which users and managers are able to obtain data regarding vehicle subject repossession based upon arrangements between clients 346 and the third-party repossession companies.

The master administrator is responsible for accepting or pre-authorizing dial-in telephone numbers, authorized IP addresses, or other external communication device 130 identifiers corresponding to the various users. The master administrator can create, delete, and manage the user-level and the manager-level accounts. Further, the master administrator may set a particular maximum number of users and managers in the vehicle tracking and locating system 100.

The master administrator may also access the real-time log 240 that is maintained by the vehicle tracking and locating system 100. The real time log 240 may record all of the queries requested by the users, and all the responses provided to the users. The report may indicate the frequency of successful license plate number matches and statistics surrounding the matching process, such as the number of matches per 100 queries, and the like. Such statistics may also include geographical data so that the success rate for matches can be correlated with various geographical locations.

The manager-level entity is typically a member of an external repossession company, which may employ for example, ten users, agents, or drivers. A technician at the external repossession company may be considered to be a manager, and such a manager is typically able to provide authorization to the various users or drivers, under authorization from the master administrator.

Figure 4:
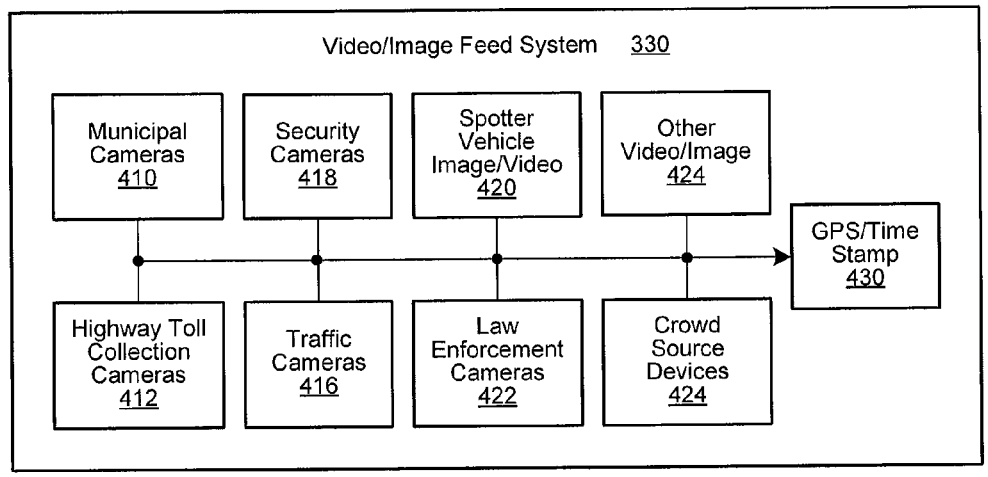
FIG. 4 is a block diagram of an exemplary video and image feed system according to one embodiment.

The video and image input processor 312 of the database controller 110 receives video and image data from the video/image feed system 330. The video/image feed system 330 is shown in greater detail in FIG. 4. The video/image feed system 330 provides a real-time data stream of license plate data for storage in the master database 114.

The video data and image data may be received from a plurality of sources, such as from municipal cameras 410, highway toll-collection cameras 412, traffic cameras 416, security cameras 418, spotter vehicle cameras 420, law enforcement cameras 422, "crowd-source" external devices 424, and other video image capture devices 424, which may correspond to mobile image capture devices or fixed image capture devices. Spotter vehicle cameras 420 are typically mounted on "spotter cars" and/or tow trucks, which may continuously capture images of vehicles and their license plates as the spotter vehicles drive along streets, travel through parking lots, and along other access routes.

Once the images of the vehicles and their license plates are captured, by whatever means available, automatic license plate recognition processing may be applied to the images to isolate, extract, and identify the license plate number prior to storage in the master database 114, along with the time and date that the image was captured, and including the geographical location or coordinates of the image capture. To facilitate this process, the license plate recognition system 128 (ALPR) and the OCR system 129 may be operatively coupled to the video and image input processor 312.

The automatic license plate recognition system (ALPR) 128 may be a commercially available recognition system embodied either in hardware components and/or software components. For example, the license plate recognition system 128 may be commercially available from PIPS Technology, a Federal Signal Company, of Knoxville, Tenn. Software processing modules to facilitate ALPR may also be commercially available from Inex/Zamir of Knoxville, Tenn., under the name of Insignia software.

In one embodiment, the video images are transmitted with an indication of a time and date that the image was captured in addition to the geographic location where the image was captured. The geographic location may be provided by an associated GPS system 430 coupled to the image capture device. Alternatively, for fixed image capture devices, a known geographical location of the fixed camera may be transmitted, or an identifying number of the fixed camera may be transmitted so that the vehicle tracking and locating system 100 can assign a predetermined geographical location to the fixed image capture device.

As described above, the user may transmit a data request to the request server 116 by inputting a vehicle identification number (VIN) or a license plate number. Using the external communication device 130, such as a digital camera, the user may also capture an image of the license plate number and transmit a photographic image of a license plate number to the request server 116. A video stream may also be captured. The input request processor 120 may transmit the image or the video stream to the video and image input processor 312 of the database controller, which in turn, may utilize the license plate recognition system 128 and/or the OCR system 129 to convert the photographic image into a license plate number suitable for storage in the master database 114.

As described above, the user may direct an MMS message to either the multimedia messaging service module 216 or to the MMS third party service provider 226. The MMS data format is more complex than a text message because the information requested is usually embedded in an image or series of images (video stream), and must be extracted using some form of recognition processing, such as the license plate recognition system 128 and/or the optical character recognition system 129. Once the MMS message has been received by the MMS service module 216 each image or each frame of the video stream is analyzed to locate and isolate the portion of the image that contains the license plate image.

The OCR recognition system 129 may be used to determine the particular portion of the image that contains characters, such as the license plate. The OCR recognition system 129 may crop and discard the portion of the image that is determined not to contain text data. The OCR recognition system 129 may be a color OCR system or an infrared OCR system. Alternatively, if the image as originally captured has a tight-focus, meaning that the image captured only includes the image of the license plate, the image may be transmitted directly to the license plate recognition system 128 without preprocessing by the OCR recognition system to isolate the license plate.

In another embodiment, the OCR recognition system 129 may be incorporated into the ALPR system 128. The ALPR system 128 may then analyze the image of the license plate to convert the image to alphanumeric characters representing the license plate number.

The following is an example of an agent or a spotter using a mobile device, such as a smart phone 134, to transmit MMS data to the vehicle tracking and locating system 100. The agent or user may walk through parking garage or public area, or may be a passenger in a moving vehicle, and may point the hand-held mobile device 130 (external communication device) toward parked or moving vehicles to capture images of the license plates.

The smart phone 134 may be recording and saving the video stream in memory or may be streaming the video in real-time through a cellular connection to the MMS third party service provider 226 or the MMS service module 216. In this way, each image or sequence of images is processed by the vehicle tracking and locating system 100 to isolate the plurality of license plate numbers captured.

Each license plate number captured is forwarded to the database controller 110 to perform a data match and or save the data if it does not exist in the database 114. Preferably, all license plate numbers are saved in the master database 114 along with the time that the image was captured and the location of capture based upon the GPS tag associated with the data transmission.

In one embodiment, to reduce the storage requirements of the database 114, certain license plate numbers may be deleted if they are "stale," meaning that the associated timestamp is very old. Whether the external communication device 130 is streaming the video in real-time or whether it is transmitting the recorded video or still frame image at a later time from memory, the MMS module 216 analyzes the images on a frame-by-frame basis.

Turning back to FIG. 2, the request server 116 may provide the authentication component 230, which includes login control and verification. In one embodiment, the user is not required to affirmatively log-in. Rather, using caller-ID, IP address confirmation, or a similar process, the authentication component 230 may recognize the phone number or internet address of the caller or other identification of the external communication device 130, which has been preauthorized for acceptance by the authentication component 230. Each telephone or other communication device 130 is preferably authorized in advance for acceptance by the authorization component 230.

Alternatively, the authorization component 230 need be not be resident in the request server 116 or in the vehicle tracking and locating system 100, and may be provided by a third-party component or service, such as the SMS third party service provided 224 or the MMS third party service provider 226 discussed above. Any third-party provider may assist in authenticating the user.

In another embodiment, when the user places a call to the request server 116, the request server transmits a display interface or GUI to the user, and the user may then provide a security code or other password to gain access to vehicle tracking and locating system 100. Of course, the third-party component or service such as the SMS or MMS third party service provider 224, 226 may also transmit the display interface or GUI to the user.

Once the user has transmitted a request to the request server and 116 and has been properly authenticated, the search engine 311 determines if the requested license plate number is found in the database, subject to the above-described criteria for permitting the user to obtain access to information. If a match is found, the output processor 122 organizes and transmits the data of interest to the user in one of a variety of possible formats, depending upon the format in which the request was received.

The data of interest may be transmitted as text, a synthesized voice message based on text, and may also be transmitted in the form of documents, such as in PDF format, JPG format, or document text format, or in other suitable electronic format. The data of interest may include information about the vehicle, including vehicle year, vehicle make, vehicle color, vehicle model, vehicle owner, lien holder, vehicle identification number, vehicle location history, case number, date of repossession action, reporting agency, credit agency, date stolen if applicable, and the like.

As shown in FIG. 1, each external communication device 130 may include a resident application or "App," 150 which is a specific plug-in or software module installed on the external communication device 130 to facilitate the above communication process. Preferably, the application 150 is installed on a smart phone, tablet, or other device having an operating system used by a large number of people. For example, mobile devices using the Google's Android™ operating system or Apple's iOS™ operating system may implement the application 150.

The application 150 increases the efficiency and flexibility of the system 100, minimizes use of customized hardware and software to reduce cost, and increases user or agent convenience, satisfaction, and efficiency. Such an application 150 may replace customized software modules, and provides a uniform interface to the user or agent. Further, because most external communication devices 130, such as smart phones 134, are GPS-enabled, images and video captured by such devices can be tagged with the GPS coordinates so that the location of the image (vehicle) captured is associated with its corresponding location.

Such applications 150 may be used by the agent, or by the members of the general population that receive compensation to provide video or images to the vehicle tracking and location system 100. This is referred to as "crowd-sourcing," that is, employing the masses or general population as spotters to participate in providing data to the vehicle tracking and locating system 100. For example, students may be paid a commensurate amount to record and/or stream video images of the areas in which they travel using external communication devices 130 they own.

Such video may be recorded for subsequent transmission, or may be transmitted in real-time to the vehicle tracking and locating system 100. The student need only download the application 150 to his or her mobile device and activate the application to permit the device to record any and all images. In one embodiment, the participating students or spotters may be paid a stipend depending upon the volume of recorded information. In another embodiment, to encourage higher-quality information, the students may be paid a percentage of fees received if the information provided by the student is used in an actual repossession or identification of a vehicle in question.

Embodiments of the vehicle tracking and locating system 100 are not limited to finding only vehicles of interest, such as vehicles subject to repossession. The vehicle tracking and locating system 100 may also find application in parking enforcement. For example, a parking enforcement officer or agent may have an external communication device 130, such as a smart phone 134, for which the above-described application 150 is installed.

The officer or agent may travel past many parked vehicles while the smart phone 134 streams video data or still photographs to the vehicle tracking and locating system 100, preferably in MMS format. Based upon a recorded images of the plurality of license plates, the vehicle tracking and locating system 100 may isolate, recognize and identify each license plate number and compare the license plate numbers to the municipal vehicle database 326 operated by a municipality or other government body. The municipal vehicle database 326 may contain records corresponding to vehicles having outstanding parking or other violations. The vehicle tracking and locating system 100 may also request data from the National Crime Information Center (NCIC) database 328.

Based on a match between the license plate number recognized and the license plate number contained in the database, the output processor 122 may provide an output to a parking meter enforcement agent that confirms that a vehicle scanned has outstanding tickets, and thus should be impounded or booted with a Denver Boot™ or similar immobilization device. The parking officer or agent may receive a graphic output or notification directly on the smart phone 134 or display device. Alternatively, the smart phone 134 may be coupled to a wireless or wired printer so that a hardcopy can be printed. If the officer or agent has printing capability, a further citation maybe printed and issued and a affixed to the vehicle in lieu of impoundment.

In another embodiment, the automatic license plate recognition system 128 (ALPR) may be used in conjunction with the dimensional recognition or object recognition system 129A so that the dimensions or general shape of the vehicle may be identified and quantified. In this way, a license plate number recognized can be compared to the municipal vehicle database 326 to verify that the license plate indeed belongs to that specific type of vehicle to which it is affixed. For example, once the license plate number has been recognized, the make and model of the vehicle may be obtained from the official vehicle registration database 326.

A vehicle dimension database 160 (FIG. 1) may be part of or may be included in the master database 114 or may be separate therefrom. The vehicle dimension database 160 may include information as to the overall dimensions of every make and model of vehicle. In operation, when the license plate recognition system 128 (ALPR) extracts the license plate number of a particular vehicle, it may instruct the database controller 110 to request the make and model of that vehicle from the municipal vehicle database 326 or other database containing official vehicle registration information, if such information is not already of record in the master database 114. Of course, the request for information from the municipal vehicle database 326 need not necessarily be made by the database controller 110, but rather, may be made by the request server 116 or other component of the vehicle tracking and locating system 100.

In one embodiment, for example, if the municipal vehicle database 326 indicates that the vehicle scanned is a Volkswagen, but the vehicle dimension database 160 indicates that the size of the vehicle corresponding to the license plate number is much larger than a Volkswagen, an alert can be issued indicating that the license plate may be stolen and is affixed to the wrong vehicle. The system may also use additional vehicle information retrieved from the dimension database 160 and municipal vehicle database 326, as well other public databases containing official vehicle information, to assist in identifying license plates that are affixed to the wrong vehicle. For example, the system may retrieve vehicle information relating to color, size, make, model, series, or any other identifying information and may use this information to identify license plates located on incorrect vehicles. The system may provide for automatic recognition and comparison of vehicle features, or may place potential matches in a queue for a system administrator to review and verify. In either scenario, the system can store the information identifying mismatched license plates as CPIC (correct plate, incorrect car) leads.

In another embodiment, the vehicle tracking and locating system 100 may provide a "proximity alert" for fleet and dispatch management. A "proximity alert" may generally be used in identifying locations of interest, as further described in connection with FIGS. 7-9. However, a proximity alert may also be used to provide efficiencies in fleet and dispatch management by identifying client devices that are within predefined proximity to a location of interest, which may be, for example, an address where a vehicle is frequently spotted. In this embodiment, the identity of vehicles of interest (whether subject to repossession or of interest for any reason, such as for marketing purposes) are downloaded or imported into a GPS navigation device 140, or map enabled smart phone 134 installed in the agent's or spotter's vehicle. Of course, the GPS navigation device 140, smart phone 134, or other suitable device must have a sufficiently large memory to accommodate all of the data. The GPS navigation device 140 may be a commercially available navigation device, such as those provided by Garmin Corporation.

The GPS navigation device 140 may then compare the current location of the agent's vehicle (in a real-time), against the location of all of the downloaded data corresponding to various vehicles or other locations of interest. The GPS navigation device 140 may then compare the location of each vehicle of interest in memory to the current location of the agent's vehicle to determine the distance from the agent's vehicle to the stored location data for the vehicle of interest, assuming the time stamp associated with the vehicle of interest is not "stale."

If the GPS navigation device 140 determines that the vehicle of interest is within a predetermined radius of the agent's vehicle, for example, within one mile, and the time stamp was relatively recent, for example, within five minutes, the GPS navigation device 140 may alert the agent and direct the agent to the last known location of the vehicle of interest.

In that way, the agent could attempt to locate and track the vehicle of interest and take appropriate action. Of course, the predetermined radius and the time stamp differential (i.e., the current time minus the timestamp associated with the vehicle of interest) may be increased or decreased depending upon the application and the scope of the agent's work. Also, to keep the data "fresh," or up-to-date, the information corresponding to the vehicles of interest are preferably downloaded to the GPS navigation device 140 periodically, such as every 5 minutes, for example.

Alternatively, the data corresponding to the vehicles of interest need not be downloaded and remain resident in the GPS navigation device. Rather, the GPS navigation device may communicate in real-time with the vehicle tracking and location system 100, and may transmit the current location or coordinates of the agent's vehicle to the vehicle tracking and location system, for example every 30 seconds. The vehicle tracking and location system 100 may then compare the location of the agent's vehicle to all of the vehicles of interest in the database 114 based upon the location of the vehicle of interest and the time that the vehicle of interest was spotted.

If the vehicle of interest was spotted within a predetermined radius of the current location of the agent vehicle, and if the time that the vehicle of interest was spotted was relatively recent (i.e. within the last 10 minutes, for example), the vehicle tracking and location system 100 may inform the agent through the GPS navigation device 140 or other alert methods that may be handled, for example, by output processor 122, including email, text message, or similar alert, that a vehicle of interest was spotted and may be close by. The GPS navigation device 140 may also provide navigational directions to the agent to facilitate pursuit of the vehicle interest, at least with respect to its last known location.

Note that the vehicle tracking and location system 100 may provide navigational directions to the agent or spotter should the agent not be in possession of a GPS navigational device. Based on the coordinates of a destination, reverse geo-coding can be applied to either the vehicle interest or the agent vehicle. Reverse geo-encoding means that once the GPS coordinates of a destination are known, a map or navigational directions, or an address can be transmitted to the agent's smart phone or other device. In one embodiment, a commercially available reverse geo-coding system, such as Google Maps™, Microsoft Bing On-Line™, Microsoft MapPoint™, Streets & Trips™, or MapQuest™, may be used.

The vehicle tracking and locating system 100 may be embodied as a system cooperating with computer hardware components and/or as computer-implemented methods. The vehicle tracking and locating system 100 may include a plurality of software modules or subsystems. The components, modules, or subsystems, such as the request server 116, the input request processor 120, the output processor 122, the database controller 110, the video and image input processor 312, the client data processor 310, the search engine 311, the license plate recognition system 128, the optical character recognition system 129 and other components and/or modules of the vehicle tracking locating system 100, may be implemented in hardware, software, firmware, or any combination of hardware, software, and firmware.

Such components, modules, or subsystems may or may not reside within a single physical or logical space. For example, the components, modules, or subsystems referred to in this document and which may or may not be shown in the drawings, may be remotely located from each other and may be coupled by a communication network.

Figure 5:
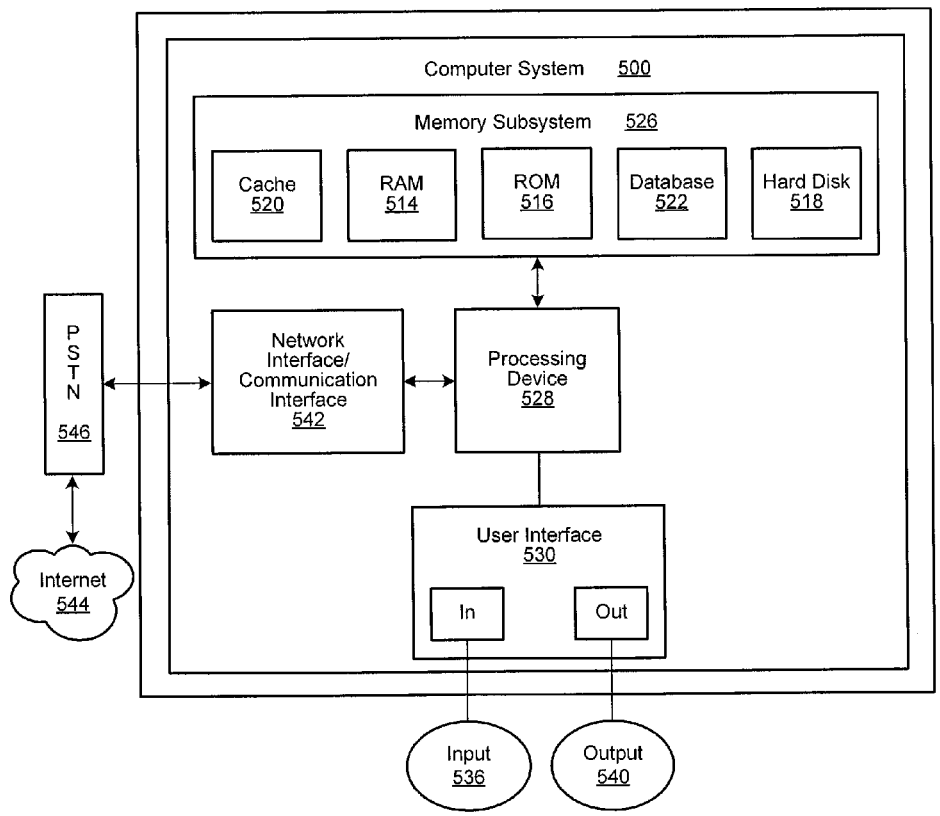
FIG. 5 is a block diagram of an exemplary computer system or server according to one embodiment.

FIG. 5 is a high-level hardware block diagram of one embodiment of a computer system hardware embodiment that may perform some or all of the functions of some of the components, modules, and/or subsystems described above. Such a computer system 500 may be embodied as a system cooperating with computer hardware components and/or as computer-implemented methods and is shown in FIG. 5 as a high-level hardware block diagram of a system computer 500 that may be used to execute software or logic to implement the processing of the components, modules, and/or subsystems described above.

The computer 500 may be a personal computer and may include various hardware components, such as RAM 514, ROM 516, hard disk storage 518, cache memory 520, database storage 522, and the like (also referred to as "memory subsystem 526"). The computer 500 may include any suitable processing device 528, such as a computer, microprocessor, RISC processor (reduced instruction set computer), CISC processor (complex instruction set computer), mainframe computer, work station, single-chip computer, distributed processor, server, controller, micro-controller, discrete logic computer, and the like, as is known in the art. For example, the processing device 528 may be an Intel Pentium® microprocessor, x86 compatible microprocessor, or equivalent device, and may be incorporated into a server, a personal computer, or any suitable computing platform.

The memory subsystem 526 may include any suitable storage components, such as RAM, EPROM (electrically programmable ROM), flash memory, dynamic memory, static memory, FIFO (first-in, first-out) memory, LIFO (last-in, first-out) memory, circular memory, semiconductor memory, bubble memory, buffer memory, disk memory, optical memory, cache memory, and the like. Any suitable form of memory may be used, whether fixed storage on a magnetic medium, storage in a semiconductor device, or remote storage accessible through a communication link. A user or system interface 530 may be coupled to the computer system 500 and may include various input devices 536, such as switches selectable by the system manager and/or a keyboard. The user interface also may include suitable output devices 540, such as an LCD display, a CRT, various LED indicators, a printer, and/or a speech output device, as is known in the art.

To facilitate communication between the computer 500 and external sources or other components, modules, and subsystems, a communication interface 542 may be operatively coupled to the computer system 500. The communication interface 542 may be, for example, a local area network, such as an Ethernet network, intranet, Internet, or other suitable network 544. The communication interface 542 may also be connected to a public switched telephone network (PSTN) 546 or POTS (plain old telephone system), which may facilitate communication via the Internet 544. Any suitable commercially-available communication device or network may be used.

Figure 6:
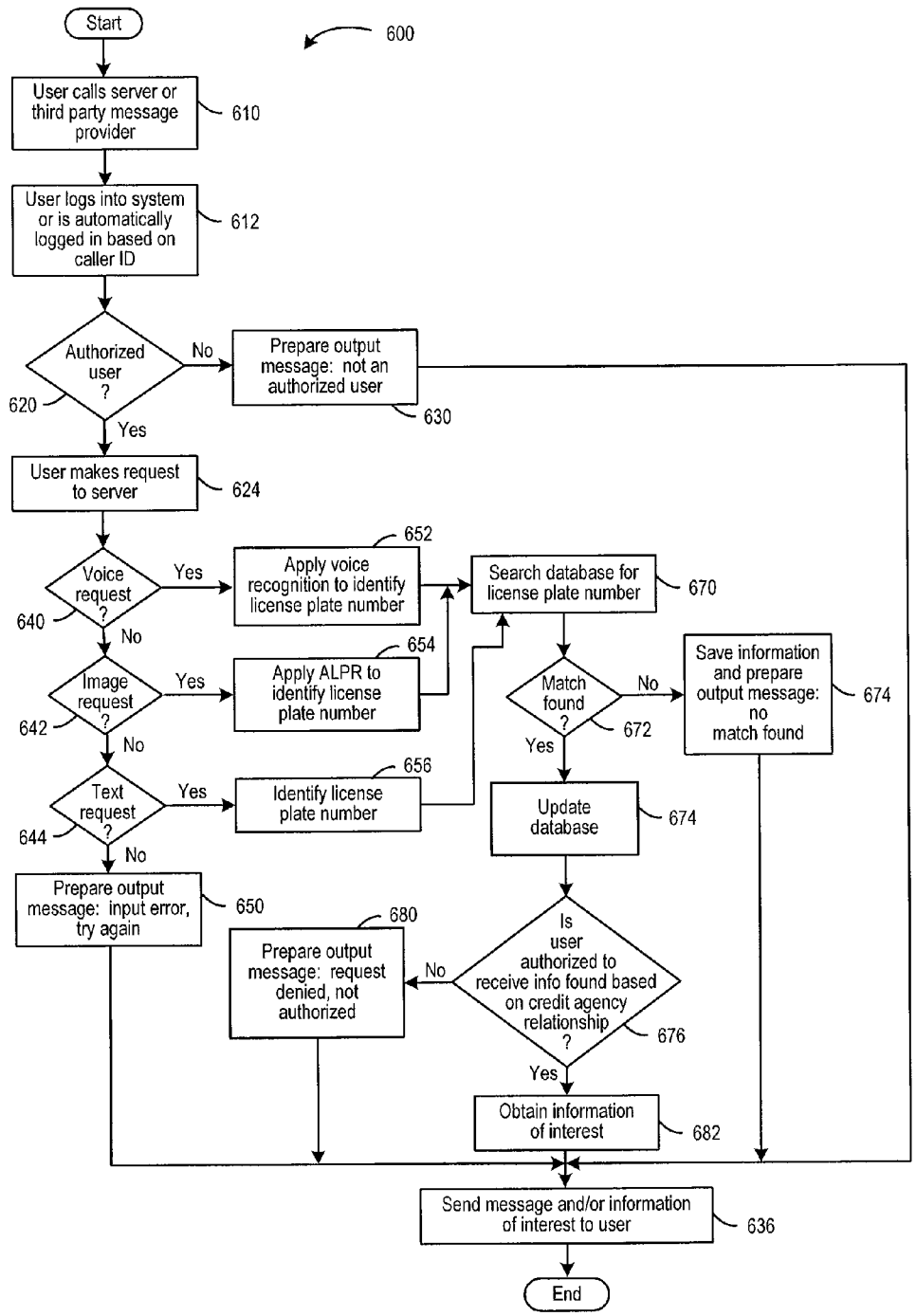
FIG. 6 is a flowchart illustrating an exemplary process of the vehicle tracking and locating system according to one embodiment.

FIG. 6 illustrates a process 600 according to the vehicle tracking and locating system 100. In one embodiment, the user contacts the request server 116 using the external communication device 130, or calls the third-party provider service 224 based on the communication format (610). The user then logs into the vehicle tracking and locating system 100, or alternatively, is automatically logged in based on caller-ID, IP address, or other identifier (612) corresponding to the external communication device 130.

If the user is authorized (620) to access the vehicle tracking and locating system 100, the user then initiates a request (624) to the request server or third-party provider service 224. If the user is not authorized (620), an output message is prepared indicating that the user is not authorized (630), processing then branches to a component that outputs the prepared message (636), and the routine exits. The component that prepares and/or sends the output message, in some embodiments, may be the output processor 122.

The user may provide the request in a variety of formats, such as a voice request (640), an image request (642), or a text request (644). If the request is not in any of the required formats, an output message is prepared indicating an input request error, which requests that the user try again (650).

If the request is a voice request, voice recognition is applied to identify the text of the request (652), which corresponds to a license plate number. If the request is an image request where the user is transmitting a digital image of a license plate, automatic license plate recognition is applied to identify the license plate number in the request (654). If the request is an video request or streaming video request, the OCR system 129 isolates the portions of the images/frames containing the license plate and forwards the cropped portions to the license plate recognition system 128 so as to identify the license plate number in the request (654). If the request is a text message, license plate number in the message is extracted (656).

Once the license plate number of interest is been extracted and identified, the search engine 311 searches the master database 114 to determine if a match exists (670). In one embodiment, if the request contains video or photographic images, and if no match is found (672), the license plate number and associated information (such as location and time) are saved in the database so as to continuously build the database, and an output message is prepared indicating that no match has been found (674). Processing then branches to the component that outputs the prepared message (636), and the routine exits.

In one embodiment, if the request contains video or photographic images, and if a match is found in the master database (672), the master database is updated with respect to the location and time (674). Next, the matching record is inspected to determine if the user is authorized to view the matching information and/or engage in actions relative to the repossession of the vehicle for which a match is found (676). If the user is not authorized, an output message is prepared indicating that the user is not authorized and that the request is denied (680). Processing then branches to the component that outputs the prepared message (636).

If the user is authorized to view the matching information and/or engage in actions relative to the repossession of the vehicle for which a match is found, the information of interest is obtained from the matching database record (682), and an output message is prepared indicating that the information is available. The output message is then sent to the user along with the information of interest obtained from the database (636), and the routine exits.

In addition to the aforementioned uses of the methods and systems, the present disclosure describes a system that may be utilized to provide proximity alerts when various client devices are within predefined distances from locations of interests. The client devices may include various devices in use by "agents" or "spotters" associated with the system or by third-party institutions that have agreements with the system administrator. The devices used by the agents, spotters, and contractors may include various ALPR systems that gather and transmit data to the central servers of the system. ALPR systems may also be used by repossession companies, state municipalities, federal, state, and local governments, skip-tracers, and may be stationary recognition devices (e.g., street cameras) or mobile recognition devices (e.g., vehicle-mounted cameras). As previously discussed, these ALPR systems may randomly view the license plates of vehicles.

In addition, to providing data regarding randomly viewed license plates, these ALPR systems, as well as other client devices associated with agents, spotters, and third-party contractors, may transmit the current location of the client device to the system server. The server may determine a location of interest based on aggregated historical data. For example, in one embodiment, the location of interest may be a location of a vehicle subject to repossession and may be determined based on historical license plate recognition (LPR) data for that vehicle. However, the location of interest need not be associated directly with a vehicle, but rather may be associated with numerous benchmarks as required by a particular system implementation. For example, in other embodiments, the location of interest may be associated with the identity of an individual, or with another asset. A location of interest may also be determined using one or more patterns of behaviors or inferences drawn from the historical data for the asset, such as frequently visited residential or commercial locations, frequently driven routes, and the like.

Figure 7:
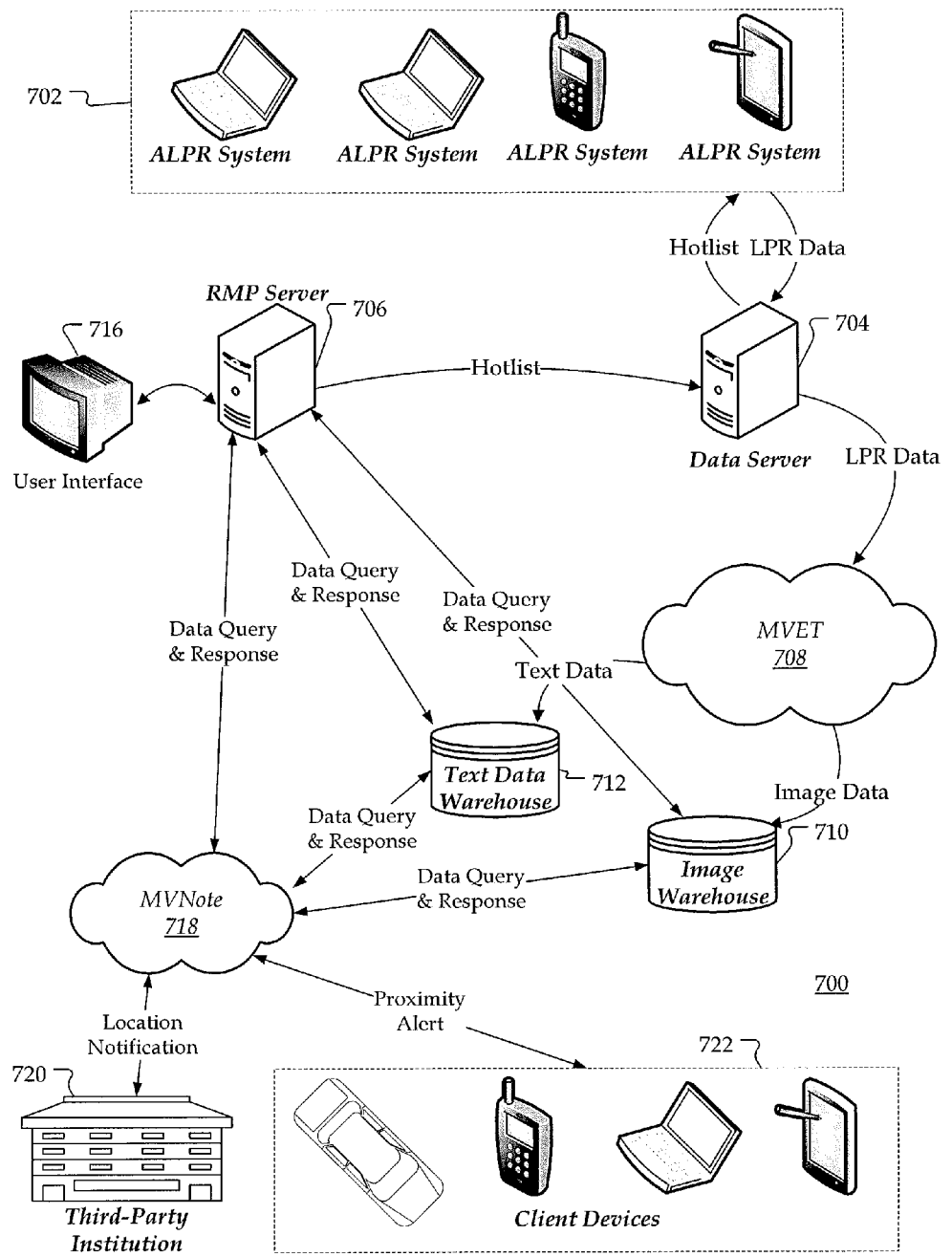
FIG. 7 is a block diagram of an exemplary data aggregation environment according to one embodiment.

FIG. 7 illustrates an exemplary data aggregation environment 700 according to one embodiment. Data aggregation environment 700 includes ALPR systems 702 in operative communication with data server 704. ALPR systems 702 may be wireless devices and/or wired devices, such as cellular telephones, smart phones, computers, mobile devices, tablets, a GPS navigation device, or any suitable communication device. ALPR systems 702 may be mobile recognition systems, such as those mounted on vehicles, or stationary recognition systems, such as street and intersection recognition devices. ALPR systems 702 may be components of the same ALPR system 128 described in connection with FIG. 1, may include any of the components of video/image feed system 330 described in connection with FIG. 4, or may be additional components to those previously described. In either event, ALPR systems 702 aggregate LPR (license plate recognition) data and transmit the LPR data to data server 704. LPR data may include video images, fixed images, or other information that can be used by a vehicle tracking and locating system, such as vehicle tracking and location system 100 described in connection with FIG. 1 above. In some embodiments, the LPR data may be processed by the video and image input processor 312 which is operatively coupled to ALPR system 128 and the OCR system 129.

Data server 704 stores the LPR data received from ALPR systems 702. Data server 704 may consist of a single data server and database or may be multiple distributed data servers and databases in operative communication over a network, such as the Internet. In certain embodiments, data servers 704 may be implemented in conjunction with manufacturer-specific tools or third-party server management tools. Example tools that data servers 704 may make use of include tools provided by 3M Back Office System Software™ or home-based server software provided by ELSAG™, and the like. Data server 704 may also receive or access data from third-party sources and manufacturers. For example, data server 704 may be in operative communication with municipal vehicle databases 326, NCIS databases 328, or receive data from client data feed systems 320, as well as from other third-party entities. Data server 704 can be a cache server that aggregates and stores all LPR data from the various sources in a format that may be accessed by data extraction tools, such as MVET (Motor Vehicle Extraction and Transmission) tool 708.

In some embodiments, data aggregation environment 700 may include one or more MVET tools 708. MVET tool 708 is a data extraction and transmission tool that can be designed to overlay various components of data server 704 and may be integrated with any of the aforementioned manufacturer-specific or third-party server management tools. MVET 708 may be coupled to one or more processors, servers, and databases to perform the particular data extraction and data processing functionality to be implemented by the MVET tool. Data aggregation environment 700 may include multiple instances of MVET tool 708, each of which may be designed to overlay a subset of components from data servers 704. Regardless of the implementation of data server 704, MVET tool 708 is designed to access and extract data from data servers 704.

MVET tool 708 extracts LPR data from the data server 704. For example, MVET tool 708 may be designed to extract vehicle tracking information, including license plate images and license plate text. The LPR data may be processed by video and image input processor 312 which is operatively coupled to ALPR system 128 and the OCR system 129, as described in connection with FIGS. 1 and 3. MVET tool 708 may then divide and separate the images and text data. The system may use recognition software to identify additional text from the retrieved images. The image data can be transmitted to image warehouse 710 and the text data can be transmitted to text data warehouse 712. Image warehouse 710 and text data warehouse 712 may likewise consist of one of more servers and databases. Image warehouse 710 and text data warehouse 712 may be the same data warehouse, or each may consist of multiple distributed data servers and databases in operative communication over a network. An exemplary image data warehouse 710 may include web-based services, such as Amazon S3™. An exemplary text data warehouse 712 may include one or more relationship databases, such as Amazon RDS™. Image data warehouse 710 and text data warehouse 712 may be cloud computing platforms, or may consist of similar offline storage platforms.

Data aggregation environment 700 may also include RMP (recover management pro) server 706. RMP server 706 may be the same server as data server 704 or they may be one or more distributed servers in operative communication over a network, such as the Internet. RMP server 706 is a web-accessible tool that may be in operative communication with image data warehouse 710, text data warehouse 712, MVET 708, and data servers 704. In some embodiments, RMP server 706 may also be in operative communication with MVNote 718, a system component responsible for generating alerts and notifications to be sent to various user devices. RMP server 706 may implement one or more web-based user interfaces 716. Web-based user interfaces 716 may be secure portals that allow a system user to access LPR data, such as the data stored in image data warehouse 710 and text data warehouse 712, and return results specific to that user's needs.

RMP server 706 allows the system to display to a user the results of processing historical LPR data relating to one or more vehicles of interest. In this way, RMP server 706 provides a user interface that can be implemented in various configurations in order to provide a system user with an interface 716 for displaying historical LPR data in a way that suits that particular user's need or business goals. For example, in the instance of a user wishing to locate a particular vehicle for repossession, RMP server 706 may provide a mapping feature that displays historical vehicle views as flags or "hits" within a geographic area. The user interface 716 may also include one or more classifications describing an aspect of the vehicle views, such as the recency of the hit, time of day, frequency, or whether the vehicle was spotted having mismatched license plate data. In some embodiments, RMP server 706 may also generate a hotlist of vehicles of interest as well as hotlists of locations of interest. The hotlist is transmitted back to data servers 706 and downloaded or pushed to ALPR systems 702. In this way, ALPR systems 702 can receive up-to-date information for identifying vehicles of interest during use.

The hotlist may also be used by MVNote 718 to alert ALPR systems or other agent devices of their proximity to vehicles or other locations of interest. MVNote 718 includes an automated data processing and notification system that can be designed to overlay and interact with the various system components. MVNote 718 may include one or more processors and servers located on the same machine or that are in in operative communication over a network, such as over the Internet. In some embodiments, MVNote 718 may include output processor 122 or may utilize request server 116 to communicate with a variety of remote devices, such as external communication devices 130. MVNote 718 may also be in operative communication over a network, with one or more third party institutions 720 and one or more client devices 722.

Client devices 722 may include wireless devices and/or wired devices, such as cellular telephones, smart phones, computers, mobile devices, tablets, a GPS navigation device, on-board vehicle computers with telecommunication capability, or any suitable communication device capable of transmitting a GPS signal and/or receiving system notifications. Client devices 722 may be the same devices as external communication devices 130, or may include additional devices capable of communicating their location to the system and receiving proximity alerts. For example, client devices 722 may include telecommunication devices that are components of one or more vehicle busses or electronic control units, such as an entertainment bus, and that form components of a vehicle's on-board computer systems. Client devices 722 may communicate with the system and third party institutions 720 over a wireless network.

In some embodiments, a wireless network may include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable radio-frequency (RF) or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Third-party institutions 720 may include any business that has a contractual relationship or is otherwise associated with the system. Example third-party institutions include not only institutions having various interests in vehicles, such as repossession companies, vehicle recovery and salvage companies, creditor institutions, and the like, but also any institution that may be receive a benefit from the proximity alerts generated by the tracking and location system for identifying locations of interest. Such institutions may include creditors, parking management services or other municipalities tracking neighborhood parking compliance, process servers interested in tracking the location of an individual in order to complete service, law enforcement agencies, and so forth. It will be apparent to those of ordinary skill in the art that these uses are merely exemplary and that the system may be utilized to identify locations of interests and provide proximity alerts in way that may be relevant to the needs of a particular user within the spirit and scope of the present disclosure.

Figure 8:
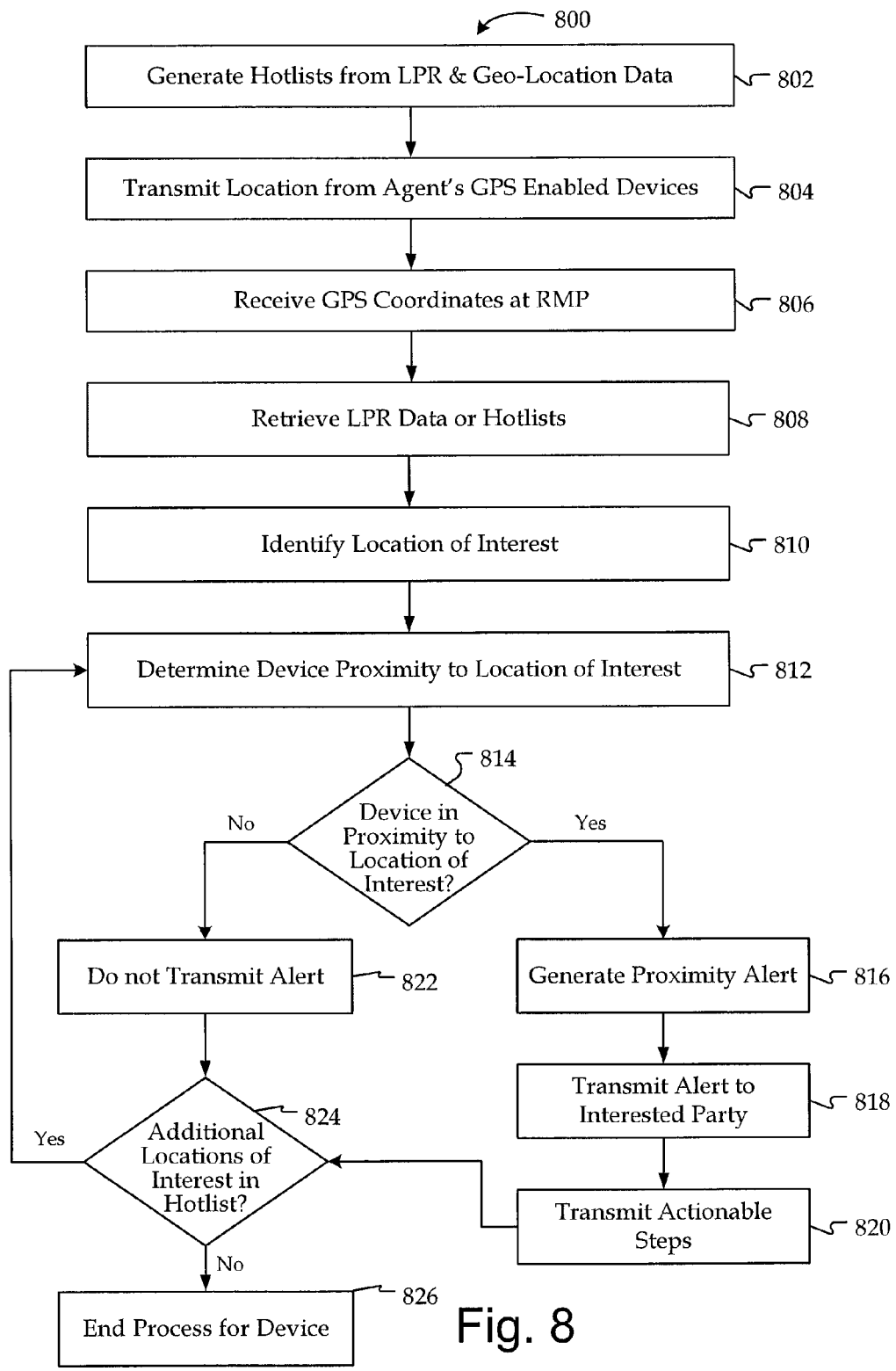
FIG. 8 is a flowchart illustrating an exemplary process of determining a proximity to a selected address.

FIG. 8 illustrates an exemplary process 800 of determining proximity to a selected address or location of interest. In one embodiment, the system first generates hotlists from historical LPR and geo-location data (802). As described in connection with FIG. 7, the hotlists may identify a number of vehicles of interests as well as various locations of interests. The locations of interest may include addresses or geospatial data for locations that are determined to be relevant to the interests of one or more system users. The hotlists of locations of interests for a particular user may be generated using a location index, as described further in connection with FIG. 10. The location index can include any data that is stored by the system and used to make inferences regarding patterns of behavior. The system uses the data stored in the location index, as well as the inferences from therefrom, to identify locations of interest and add them to the respective hotlists for various system users. For example, data components of the location index may include the textual information captured by the ALPR systems, as well as the timestamp, date, and geographical location associated with the ALPR system and transmitted to the system servers when the image was captured and uploaded to the system servers.

The system processes the stored location indices to identify locations of interest and to generate hotlists of identified locations. The method for determining which location of interest may be relevant to a particular user can be adapted to take into account the various parameters that may be relevant to that user's business goals. Depending on the business goals of the system user, the system may use various methods of algorithmic analysis to identify locations of interests that meet certain eligibility criteria for the particular use case. Thus, depending on the business goals of the particular system user, hotlist entries will be generated by considering only the elements of the location index that are relevant to a particular context or use case. The hotlist entries may be stored individually as a separate hotlist corresponding to each user, or may be stored as part of a collective data structure where entries are associated with one or more groups of users sharing an interest in the particular location. In either scenario, the system may continually monitor LPR data and geo-location data being generated by the ALPR devices in order to update the hotlists by adding or removing locations of interest as the new information is received.

Once the hotlists are generated, the system proceeds to monitor geo-location data for the various agent devices associated with the system. The system receives periodic transmissions containing geo-location data from the GPS enabled devices of agents and other telecommunication devices in communication with the system servers (804). Agents of the system may include users having a contractual or business relationship with the system administrator, skip-tracers, spotters, and the like. These agents may be traveling on foot or in a vehicle and may be continuously transmitting their location from a GPS enabled device or other telecommunication device as the agent travels along streets, sidewalks, through parking lots, and along other access routes. The telecommunication and GPS enabled-devices, which may be the same devices as client devices 722 or external communication devices 130, are in operative communication with one or more servers associated with the system. The GPS enabled-devices may communicate with the servers asynchronously or in real-time. In some embodiments, the GPS enabled-devices may be in operative communication with one or more of request server 116, data server 704, or RMP server 706.

The GPS data of the agent devices is received by the system servers and the location of the device is determined (806). Although reference is made is to GPS enabled devices, it should be noted that in some embodiments, other methods of determining a telecommunication device's location from transmitted data may be used, including, but not limited to, triangulation, multilateration of radio signals, or location-based services that disclose actual coordinates or other geo-location data of a communication device. In any event, once the geo-location data is received by the server, the server can retrieve historical LPR data and one or more hotlists generated by the system (808) that may be associated with the geo-location data. The hotlists may be stored as logical data structures in one or more relational databases associated with the systems servers, such as master database 114 and those in operative communication with MVNote 718. As previously mentioned, the hotlists may be individually associated with one or more systems users or may be composite hotlists having locations of interest for all users or a sub-group of related system users. For example, in order to improve efficiency in data retrieval and processing, the hotlists may be separated by particular use cases, such as law enforcement agencies or parking management companies, and each may include notification information for all users having business goals falling within the particular category or use case. In this case, the system need only retrieve and process the hotlists for a particular category or use case in order to identify all notifications should be generated.

In any event, once the relevant hotlists have been retrieved, the system identifies all of the locations of interest in the hotlist (810). The system may identify each location of interest in an iterative process or may simultaneously identify and monitor locations of interest using one or more parallel processors. For each location of interest in the hotlist, the system then compares the device's location data with that of the location of interest (812) and determines whether the device falls within a given proximity to the location of interest (814). In some embodiments, a predetermined radius may be associated with each location of interest and used to determine whether a device is in proximity to the location of interest. The system may also consider a time stamp associated with the data used to generate the location of interest in order to ensure that the data is not outdated or "stale." If the system determines that the device is within a given proximity of the location of interest, for example, within three miles, and the time stamp was relatively recent, for example, within six hours, the system may generate a proximity alert (816).

In some embodiments, the hotlist may be downloaded and stored to the GPS-enable device. The GPS enabled device may then compare the current location of the device (in a real-time environment), against the location of all of the downloaded data corresponding to various locations of interest. The GPS enabled device may then compare the coordinates of the device to each location of interest to determine the distance of the location from the GPS enabled device. A proximity alert can be generated and displayed on the screen of the device when the device is determined to be within the given proximity of the location of interest.

In either embodiment, the proximity alert may be generated in the form of a notification or alert that is transmitted to an interested party (818). The interested party may be the GPS enabled device or other telecommunication used by an agent, such as the device of the agent that transmitted the location in step (804), or may be a third-party institution 720, as described in connection with FIG. 7. The alert may be generated by one or more of the system components previously described in connection with FIGS. 1 and 2. For example, in some embodiments, the alert may generated by output processor 122 and sent to request server 116 to be communicated to one or more external communication devices 103. The alert may be generated in a variety of formats as may be appropriate for the particular communication device. Such formats may include short message service (SMS) text messages, multimedia messaging service (MMS) text messages, emails, video messages, cellular calls, voicemails (VM), or pop-up notifications displayed on the screen or user interface of the device. Depending on the particular application, the system may make use of the functionality supported by one or more of SMS module 210, text message module 212, email message module 214, MMS module 216, VM module 218, video module 220, or streaming video module 222 to generate the alerts to be sent out by output processor 122.

The content and format of the proximity alert will necessarily depend on the requirements of the particular use case. However, regardless of the context, the alert may generally contain the actionable steps to be transmitted to the interested party (820). The actionable steps provide the interested party with the information needed to respond to and act on the data associated with the location of interest. The proximity alert may retrieve various components of the location index as needed in order to generate the proximity alert, and may include further processing of such index components to provide information for the actionable steps. For example, in the case of a repossessor, the repossessor's device may produce an alarm and display information related to the alert. The displayed alert may use street address information from the location index and current location of the GPS enabled device in order to generate navigational directions for assisting the agent in navigating to the location of interest, at least with respect to the last known location data for the particular location of interest. Similarly, in the case of a third-party institution being a creditor with an asset near an agent, the system may generate an alert notifying the creditor that an agent is within the proximity of an asset and available to secure recovery of the asset for a fee.

The system may use the geo-spatial data associated with the location of interest to automatically determine which agent should be assigned for recovery of the asset. For example, whenever an alert is to be generated, the system may aggregate the data for not only the location of interest and the various field agents, but also for any locations related to the anticipated recovery process, such as the repossessor's office location, storage facility, or its preferred agent. The system can then compare these locations and the geo-spatial data for the location of interest to all of the locations of the system agents in order to assign the recovery to the most efficient agent able to secure the asset. This allows the system to increase efficiency and reduce overhead by removing the need for dispatch services that are often costly and subject to human error. Additionally, in the event that an agent is unable to confirm that they are available to recover the asset, the system can quickly and efficiently send a second proximity alert to the next best agent in the system.

After transmitting the proximity alert and actionable steps to the interested party, the system will then examine any additional locations of interest in the hotlist (824). Similarly, if the original device was not determined to be in proximity to the location of the interest, then no alert would have been generated, and the system would then examine any additional locations of interest in the hotlist. If there are additional locations of the interest to be examined, the system returns to step (812) in order to examiner the device's proximity to the location of interest. If there no additional locations of interest to examine, the process may end for the particular device until further location data is received (826).

Figure 9:
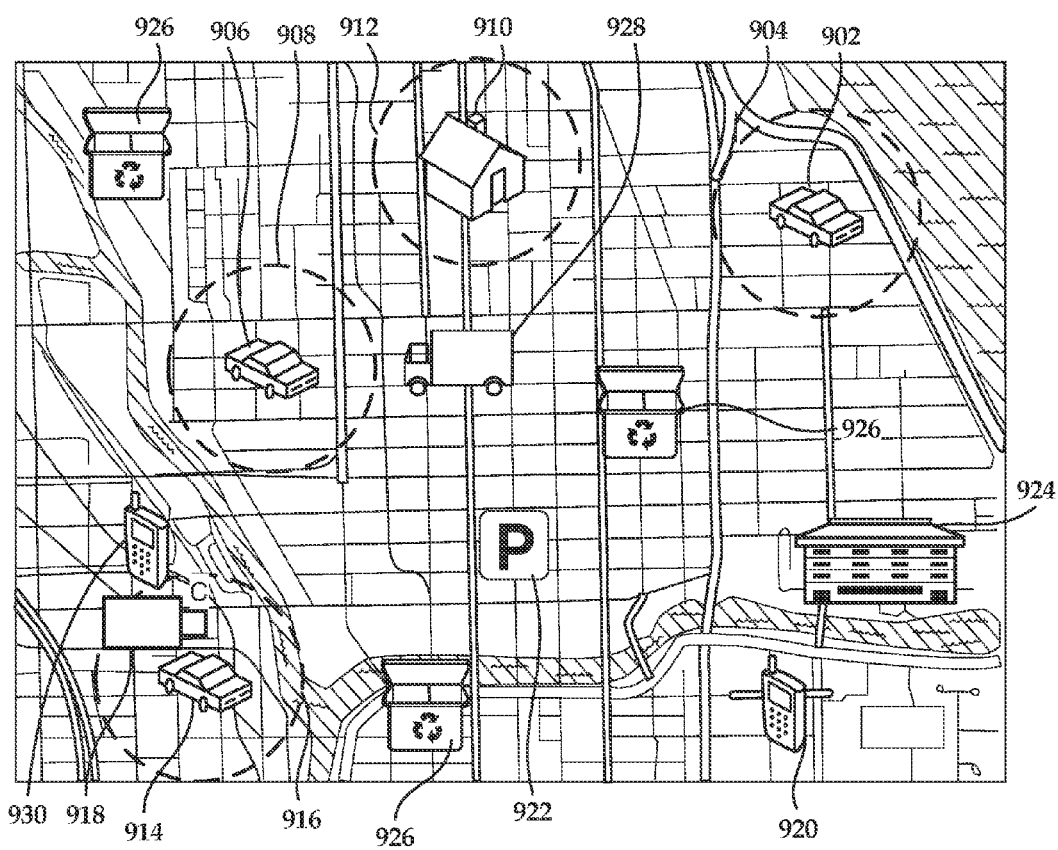
FIG. 9 is a geographical diagram of an exemplary environment for determining a proximity to a selected address.

Referring now to FIG. 9, a geographical diagram of an exemplary environment for determining a proximity to a selected address is illustrated. Exemplary locations of interest are depicted as vehicles of interest 902, 906, 914 and address of interest 910. Each of the locations of interest 902, 906, 910, 914 has proximity boundaries 904, 908, 912, 916 associated with the locations, respectively. As described in connection with FIG. 8, when an agent device 918, 920, such as a GPS enabled devices or other telecommunication devices, is determined to be with the proximity of any of the locations of interest 902, 906, 910, 914, the system will generate a proximity alert for the particular location of interest. Depending on the particular use case scenario, the system may send the alert to agent devices 918, 920 notifying the agents that they are currently located near a location of interest. For example, the system may determine that agent device 918 is with a predetermined radius of vehicle of interest 914. The system may then transmit the location of the vehicle to the agent using a proximity alert, as well any directions or additional information needed for the agent to act on the repossession or restriction of the mobility of the vehicle. For example, the system may provide the agent with navigational directions to the vehicle as well as a description of the vehicle. The system may then request that the agent confirm that the vehicle is present and available for recovery.

Alternatively or in addition to the agent alert, the system may also transmit a proximity alert to third-party institution 924, which may be a creditor of the vehicle of interest 914. The proximity alert may provide the creditor with information related to the target vehicle 914 or asset. The proximity alert may provide the third-party institution 924 with all the information needed to locate the vehicle, or may also include details regarding potential agents that are located in the area that are able to recover the asset. If the third-party institution 924 agrees to have the agent repossess the vehicle, the system may transmit a similar proximity alert to the agent device 918 informing the agent that they have been authorized to repossess the vehicle. The proximity alert may include additional information, such as the location of the nearest storage garage 922 where the repossessed vehicle may be towed and stored. The storage garage 922 may be a general storage facility or may be determined based on the preference of the particular third-party institution 924. It will be apparent to those of ordinary skill in the art that the described applications of the location index to generate proximity alerts are merely exemplary, and that many more embodiments and implementations are envisioned within the spirit and scope of the present disclosure.

As non-limiting examples, the system can be used to notify creditors or financial institutions with a security interest in any asset that an agent is located near an asset. This may allow the institution to transmit instructions to have the agent recover the asset. The agent may be an independent repossession contractor or may be an employee of a third-party financial institution that has an agreement with the system administrator to have the system provide proximity alerts for its employee's devices. The system may also provide alerts directly to the agent device notifying the agent that they are in proximity to the location of interest and in order to have the agent verify that the asset is indeed at the location. The proximity alert may allow the agent to confirm that the asset is or is not present at the location and this information can be sent back to the parties having an interest in the asset. The interested parties could include, for example, creditors, financial institutions, repossessors, vehicle salvage companies, or parking enforcement agencies.

The system may also be adapted to be used with process servers or other parties attempting to locate an individual or asset, such as law enforcement agencies. In this scenario, the system may generate locations that are related to the historical LPR data associated with the individual or their patterns of behavior. These locations may be stored in a location index, as described in connection with FIG. 10. For example, the system may identify and store locations where the individual's vehicle has been frequently spotted by ALPR devices. The locations could include street addresses, residential addresses, commercial addresses, frequently traveled access routes, and the like. In this way, the system can notify the process server or other party attempting to locate the individual that they are within a given proximity to a location where the individual is likely to be present. The proximity alert may provide directions to the location of interest and may also include any relevant data stored for the individual or asset. For example, the proximity alert could notify the process server or law enforcement agency that the individual has a violent criminal history and that discretion is advised. This additional information may be retrieved from any public database or any private database that the system has been granted access to. All of the information related to the individual and the location of interest can be stored in the location index for the particular location of interest.

Referring now to FIG. 10, an exemplary illustration of location index 1000 that may be generated according to one embodiment is depicted. Location index 1000 may be generated from the historical LPR data and other data retrieved from one or more public or private databases. Location index 1000 may be stored as a logical data structure in a relational database, such as master database 114. Location index 1000 may store all forms of data that can be generated from historical LPR data, as well as data received from external databases, such as municipal vehicle databases 326 and the NCIC database 328. All of the data may be stored by using one or more location identifying factors 1001 as a key, if possible. Alternatively, the data for each location 1001 may be organized by one or more other identifying factors until a location for the data can be inferred or otherwise determined by the system. The identifying factors for each location may include address or GPS coordinates 1002 of the location of interest and identifying information for each hit 1004, such as the time the asset was spotted, device ID of the ALPR device or other telecommunication device, or geo-location data generated by the ALPR device when it transmitted the LPR data to the system. In the case of vehicles, location index 1000 may include VIN 1006, license plate data 1008, vehicle make 1010, vehicle model 1012, registration address, or other identifying information associated with a target 1014. Additionally, the system may process the historical LPR data in order to identify one or more patterns of behavior 1016, 1018 of the target. Each of behaviors 1016, 1018 for the target may be associated with one or more sets of identifying factors and stored as an index component for each of those sets. For example, the behaviors may include other addresses where the same asset is frequently spotted.

For each of the possible sets of identifying characteristics, a number of aspects surrounding the location of interest may also be stored as part of the location index. For example, location index 1000 may also store data relating to the recency 1022 of the LPR data associated with location 1001, timestamps 1024 associated with the data, or GPS and other geo-location data 1026 associated with the underlying historical data that may be helpful when determining the location of interest. In the case of vehicles, the location index may also store data associated with each target vehicle, such as any address associated with the registered vehicle owner's registration, or those that may be determined based on patterns of vehicle use. For example, patterns of vehicle use may be determined by comparing geo-location data associated with hits on the vehicle license plate, as well as quantity of hits on the same vehicle, concentration of the hits near a specific location, and consistency and frequency of the hits location within a measured period of time. Additional factors and components may also be considered by the system as needed. A location index will generally consist of a number of these factors, as well as any inferences that may be generated by processing the historical data using one or more system algorithms, such as patterns of behavior 1016, 1018.

Depending on the needs of the particular system user, a proximity alert interest will generally be generated using the various aspects of historical LPR data that are stored as components in the location index for the particular location of an interest. Additionally, the system may determine that a proximity alert should be generated based on the stored patterns of vehicle operation that are generated and determined by one or more system algorithms. These system algorithms may process various aspects of the historical LPR data in order to identify patterns of operation for a particular vehicle or group of vehicles. These patterns will then be stored by the system. The system may also compare newly received data to the stored patterns of operation in order to identify any new patterns of operation and to store those new patterns as a behavior component in the location index. For example, the system may process newly received LPR data in order to identify any abnormalities or changes in patterns of vehicle operation that may affect the likelihood that a vehicle can be successfully recovered at a particular location. Any such identified change in vehicle operation can be stored to the location index as a new vehicle behavior. The process for determining when a proximity alert should be generated, as well as the processes for identifying patterns in vehicle behavior, may also utilize heuristic and optimization approaches to improve the accuracy of the algorithms. For instance, the processes may utilize machine learning or geospatial analysis to assign relative weights to each component of a location index, or to further optimize the processing of LPR data in order to identify patterns of vehicle operation.

The process for generating proximity alerts can be adapted and used in a number of different, user-specific contexts. While a number of applications of the process and of the location index have been identified in connection with the present disclosure, it will be apparent to those of ordinary skill in the art that the described applications of the recoverability index are merely exemplary, and that many more embodiments and implementations are envisioned within the spirit and scope of the present disclosure. The location index is adaptable and scalable and may utilize historical LPR data to generate proximity alerts for locations of interest for nearly any application.

The logic, circuitry, and processing described above may be encoded or stored in a machine-readable or computer-readable medium such as a compact disc read only memory (CDROM), magnetic or optical disk, flash memory, random access memory (RAM) or read only memory (ROM), erasable programmable read only memory (EPROM) or other machine-readable medium as, for examples, instructions for execution by a processor, controller, or other processing device.

The medium may be implemented as any device that contains, stores, communicates, propagates, or transports executable instructions for use by or in connection with an instruction executable system, apparatus, or device. Alternatively or additionally, the logic may be implemented as analog or digital logic using hardware, such as one or more integrated circuits, or one or more processors executing instructions; or in software in an application programming interface (API) or in a Dynamic Link Library (DLL), functions available in a shared memory or defined as local or remote procedure calls; or as a combination of hardware and software.

In other implementations, the logic may be represented in a signal or a propagated-signal medium. For example, the instructions that implement the logic of any given program may take the form of an electronic, magnetic, optical, electromagnetic, infrared, or other type of signal. The systems described above may receive such a signal at a communication interface, such as an optical fiber interface, antenna, or other analog or digital signal interface, recover the instructions from the signal, store them in a machine-readable memory, and/or execute them with a processor.

The systems may include additional or different logic and may be implemented in many different ways. A processor may be implemented as a controller, microprocessor, microcontroller, application specific integrated circuit (ASIC), discrete logic, or a combination of other types of circuits or logic. Similarly, memories may be DRAM, SRAM, Flash, or other types of memory. Parameters (e.g., conditions and thresholds) and other data structures may be separately stored and managed, may be incorporated into a single memory or database, or may be logically and physically organized in many different ways. Programs and instructions may be parts of a single program, separate programs, or distributed across several memories and processors.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A system for determining the proximity of client devices to locations of interest, comprising:
   a data server configured to receive data identifying a plurality of vehicles and associated vehicle locations;
   an input processor configured to process the received data to identify a plurality of locations of interest related to one or more of the plurality of vehicles;
   a database in operative communication with the data server and configured to store the locations of interest as information records;
   a notification server configured to receive data identifying geographic locations of a plurality of client devices; and
   an output processor operatively coupled to the notification server and configured to determine whether one or of more the client devices are within a predetermined proximity to one or more of the locations of interest,
   wherein the output processor is further configured to generate a proximity alert when the one or more client devices are determined to be within the predetermined proximity to one or more of the locations of interest.

2. The system of claim 1, wherein the output processor is further configured to generate instructions using data stored in the information records and corresponding to the one or more locations of interest.

3. The system of claim 2, wherein the proximity alert includes the instructions generated using the data stored in the information records.

4. The system of claim 1, wherein the proximity alert comprises one or more of a short message service (SMS) message, multimedia messaging service (MMS) messages, email, video message, cellular call, voicemails, or pop-up notification displayed on the client device.

5. The system of claim 1, wherein data identifying the plurality of vehicles is generated by a plurality of automatic recognition devices.

6. The system of claim 1, wherein the data identifying the plurality of vehicles comprises a vehicle identification number (VIN), a license plate number, a photographic image of a license plate number, or a video stream containing images of a license plate number.

7. The system of claim 1, wherein the input processor is further configured to generate a plurality of location indices for storing associated data related to each of the plurality of locations of interest in a corresponding information record.

8. The system of claim 1, wherein the input processor is further configured to identify patterns of behavior for the plurality of vehicles and store the patterns of behavior to an information record corresponding to a location of interest.

9. The system of claim 8, wherein the identifying patterns of behavior includes identifying a frequently visited residential or commercial location, a frequently traveled route, or a propensity to be located near another vehicle.

10. A non-transitory computer readable storage medium having stored therein data representing instructions executable by a programmed processor for determining proximity of communication devices to locations of interest, the storage medium comprising instructions operative for:
    receiving data identifying a plurality of assets and geographic locations associated with the assets;
    processing the received data to identify a plurality of locations of interest related to one or more of the assets;
    storing the locations of interest to a database as an information record including data related to the location of interest;
    identifying a location of a communication device;
    determining whether the location of the communication device is within a predetermined proximity to one or more locations of interest; and
    generating a proximity notification when the communication device is within the predetermined proximity to the one or more locations of interest.

11. The storage medium of claim 10, further comprising instructions operative for sending the proximity notification to the communication device to be displayed to a device user.

12. The storage medium of claim 10, further comprising instructions operative for sending the proximity notification to a third-party institution associated with the location of interest.

13. The storage medium of claim 10, further comprising instructions operative for generating instructions using data stored in the information records corresponding to the location of interest, and sending the generated instructions as part of the proximity notification.

14. The storage medium of claim 10, further comprising instructions operative generating a plurality of location indices for storing data associated with each of the plurality of locations of interest in the related information record.

15. A computer-implemented method using at least one processor for determining proximity of client devices to a location of interest, comprising:
    receiving data identifying information related to a plurality of assets and a plurality of geographic locations associated with the assets;
    processing the received data to identify locations of interest related to one or of the plurality of assets and a proximity area for each of the identified locations of interest;
    monitoring location data for a plurality of client devices; and
    generating a proximity alert when one or more of the plurality of client devices is determined to be within the proximity area for one or more identified location of interest.

16. The method of claim 15, further comprising storing information related to each of the identified locations of interest as a location index associated with the location of interest.

17. The method of claim 16, further comprising generating instructions using the stored information in the location index associated with the location of interest, and including the instructions as part of the proximity alert.

18. The method of claim 15, further comprising receiving a confirmation that an asset is located at the location of interest, and sending an alert to a third-party institution notifying the institution of the asset's location.

19. The method of claim 15, wherein the proximity alert comprises one or more of a short message service (SMS) message, multimedia messaging service (MMS) messages, email, video message, cellular call, voicemails, or pop-up notification displayed on the client device.

20. The method of claim 15, wherein the identifying information for the plurality of locations includes data identifying a vehicle and is generated by a plurality of automatic recognition devices.

* * * * *